(12) United States Patent
Jie et al.

(10) Patent No.: US 11,866,898 B2
(45) Date of Patent: Jan. 9, 2024

(54) COASTAL ZONE ECOLOGICAL PROTECTION WALL AND COASTAL ZONE ECOLOGICAL PROTECTION AND GOVERNANCE STRUCTURE

(71) Applicant: FENG HE YING ZAO GROUP CO., LTD., Nanchang (CN)

(72) Inventors: Jiangang Jie, Nanchang (CN); Mengying Ye, Nanchang (CN); Xin He, Nanchang (CN); Xiaoping Fan, Nanchang (CN); Ye Zeng, Nanchang (CN); Lianbao Wan, Nanchang (CN); Yaqi Zeng, Nanchang (CN); Renmin Xiong, Nanchang (CN)

(73) Assignee: FENG HE YING ZAO GROUP CO., LTD., Nanchang (CN)

(*) Notice: Subject to any disclaimer, the term of this patent is extended or adjusted under 35 U.S.C. 154(b) by 0 days.

(21) Appl. No.: 17/863,369

(22) Filed: Jul. 12, 2022

(65) Prior Publication Data
US 2023/0279628 A1   Sep. 7, 2023

(30) Foreign Application Priority Data

Mar. 1, 2022   (CN) .......................... 202220417791.8

(51) Int. Cl.
*E02B 3/04* (2006.01)
*E02B 3/06* (2006.01)
*E02B 3/12* (2006.01)

(52) U.S. Cl.
CPC .  *E02B 3/06* (2013.01); *E02B 3/12* (2013.01)

(58) Field of Classification Search
CPC ..... E02B 3/04; E02B 3/06; E02B 3/10; E02B 5/20; E02B 5/10; E02B 7/08; E02D 17/18; E02D 17/20; E02D 17/205
See application file for complete search history.

(56) References Cited

U.S. PATENT DOCUMENTS

| | | | | |
|---|---|---|---|---|
| 2,014,116 A | * | 9/1935 | Powers | E02B 3/06 405/23 |
| 4,225,434 A | * | 9/1980 | Ernst | E03F 5/107 210/170.03 |
| 4,362,432 A | * | 12/1982 | Conover | E02B 3/14 405/15 |
| 4,473,978 A | * | 10/1984 | Wood | A01C 3/02 52/270 |
| 4,624,604 A | * | 11/1986 | Wagner | E02B 3/16 588/259 |
| 4,818,141 A | * | 4/1989 | Rauch | E02B 3/04 405/21 |
| 4,913,595 A | * | 4/1990 | Creter, Jr. | E02B 3/06 405/32 |

(Continued)

*Primary Examiner* — Benjamin F Fiorello

(57) ABSTRACT

A coastal zone ecological protection and governance structure and a coastal zone ecological protection wall include a bottom plate, a triangular reinforcing supporting plate, and a side plate. The bottom plate is configured to fix on a foundation. The triangular reinforcing supporting plate is arranged on the bottom plate. The side plate is arranged on the bottom plate and is connected with the triangular reinforcing supporting plate. The side plate forms a certain angle with the bottom plate. All of the bottom plate, the triangular reinforcing supporting plate, and the side plate are spliced by a plurality of prefabricated plates.

7 Claims, 3 Drawing Sheets

(56) References Cited

U.S. PATENT DOCUMENTS

| | | | | |
|---|---|---|---|---|
| 5,238,326 | A * | 8/1993 | Creter | E02B 3/06 |
| | | | | 405/25 |
| 5,360,290 | A * | 11/1994 | Yamada | F04D 29/448 |
| | | | | 210/170.03 |
| 5,470,177 | A * | 11/1995 | Hughes | E02B 3/108 |
| | | | | 405/91 |
| 5,720,576 | A * | 2/1998 | Scuero | E02B 3/16 |
| | | | | 405/116 |
| 5,839,852 | A * | 11/1998 | Mattson | E01C 9/00 |
| | | | | 14/2.4 |
| 6,079,904 | A * | 6/2000 | Trisl | E02B 3/106 |
| | | | | 405/116 |
| 6,132,140 | A * | 10/2000 | Kullberg | E02B 3/106 |
| | | | | 405/102 |
| 7,708,495 | B1 * | 5/2010 | Antee | E02B 3/108 |
| | | | | 405/15 |
| 11,149,392 | B2 * | 10/2021 | Haaland | E02B 3/106 |
| 2013/0020331 | A1 * | 1/2013 | Davis | E02B 3/10 |
| | | | | 220/565 |
| 2015/0191888 | A1 * | 7/2015 | Karsten | E02D 29/0233 |
| | | | | 405/262 |
| 2018/0340305 | A1 * | 11/2018 | Ragsdale, Jr. | E02D 17/18 |
| 2019/0242083 | A1 * | 8/2019 | Liu | E02B 3/10 |
| 2021/0285174 | A1 * | 9/2021 | Babcock | E02D 5/03 |

* cited by examiner

COASTAL ZONE ECOLOGICAL PROTECTION WALL AND COASTAL ZONE ECOLOGICAL PROTECTION AND GOVERNANCE STRUCTURE

TECHNICAL FIELD

The present disclosure relates to a coastal zone ecological protection wall and a coastal zone ecological protection and governance structure that are mainly used in gravel, sandy and muddy coastal zones.

BACKGROUND

China has 18,400 kilometers of land coastline and 14,247 kilometers of island coastline, which reach a total of more than 32,600 kilometers. The coastline is a very good ecological barrier. In order to protect coastal ecological barriers from natural disasters such as typhoons, waves, rainstorms, and fires, it is necessary to provide a set of ecological protection and governance measures.

Currently, although China has strengthened protection of coastal wetlands and constructed concrete protective dams, there are many deficiencies in conventional protective dams. Although the concrete protective dams can prevent erosion of an embankment by waves, it destroys an ecological environment of the coastal zone, reduces biodiversity, and further reduces a utilization rate of the coastal zone.

SUMMARY

A purpose of the present disclosure is to provide a coastal zone ecological protective wall, which is factory prefabricated, is able to be installed on site and has a long service life.

To achieve the above purpose, the present disclosure provides a coastal zone ecological protection wall. The coastal zone ecological protection wall comprises a bottom plate, a triangular reinforcing supporting plate, and a side plate. The bottom plate is configured to fix on a foundation. The triangular reinforcing supporting plate is arranged on the bottom plate. The side plate is arranged on the bottom plate and is connected with the triangular reinforcing supporting plate. The side plate forms a certain angle with the bottom plate. All of the bottom plate, the triangular reinforcing supporting plate, and the side plate are spliced by a plurality of prefabricated plates.

Furthermore, the coastal zone ecological protection wall further comprises a wedge-shaped spacer block. The wedge-shaped spacer block is arranged at an oblique-angle gap between the bottom plate and the side plate.

Furthermore, installing holes are defined on the bottom plate, the triangular reinforcing supporting plate, and the side plate. The installing holes are configured for anchor rods to pass through.

Another purpose of the present disclosure is to provide a coastal zone ecological protection and governance structure that is able clarify, store, and discharge rainwater in an orderly manner. The coastal zone ecological protection and governance structure comprises the coastal zone ecological protection wall described above, a storage reservoir and a drainage channel. A drainage pipe is arranged on a side wall of the storage reservoir; the storage reservoir is communicated with the drainage channel. The drainage channel is configured to discharge rainwater to the storage reservoir and discharge the rainwater in the storage reservoir to a coastline shelterbelt.

Furthermore, the coastal zone ecological protection wall is applied to the storage reservoir.

Furthermore, the coastal zone ecological protection wall is applied to the drainage channel.

Furthermore, clarification ditches are arranged on a top portion of the storage reservoir and a top portion of the drainage channel. The clarification channel is communicated with the storage reservoir or the drainage channel through discharging pipes.

Compared with the prior art, the present disclosure adopts factory prefabrication, can be installed on site, has construction progress block, high efficiency, and long service life.

Compared with a conventional process, the cost is lower and the economic benefit is higher;

The present disclosure adapts to construction operations of different terrains and landforms, and has obvious achievements in protection of coastal zones.

The present disclosure has functions of orderly discharging rainwater, collecting rainwater, etc., systematically solves a phenomenon that the rainwater in the rainy season scours the coastal zones and causes the forest land to be washed away, and simultaneously solves a phenomenon of forest drought and death caused by lack of water in the dry season. The present disclosure also has fire-proof and insect-proof functions.

Figure 1:
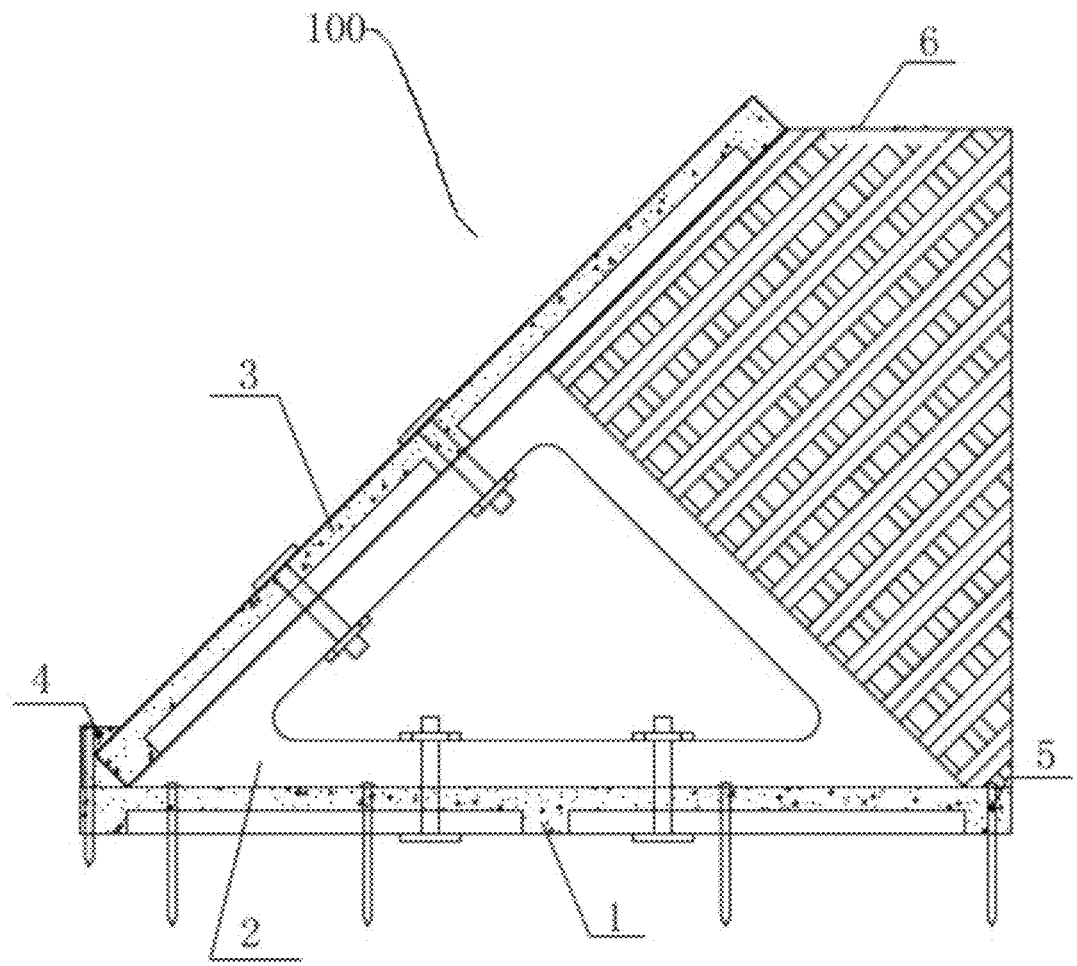
FIG. 1 is a cross-sectional schematic diagram of a coastal zone ecological protection wall according to one embodiment of the present disclosure.

In the drawings:
100-coastal zone ecological protection wall; 200-storage reservoir; 300-drainage channel; 1-bottom plate; 2-triangular reinforcing supporting plate; 3-side plate; 4-wedge-shaped spacer block; 5-anchor rod; 6-vegetation; 7-clarification ditch; 8-side plate connecting screw; 9-waterproof glue; 11-reinforcing rib; 12-discharging pipe; 13-drainage pipe; 14-bolt hole.

DETAILED DESCRIPTION

It should be noted that, in this embodiments, orientation words such as "up" and "down" are all described in accordance with the drawings, and do not constitute a limitation to the present disclosure. In addition, in the embodiments, materials used are all materials resistant to corrosion by seawater and sea breeze.

As shown in FIGS. 1-6, the present disclosure provides a coastal zone ecological protection and governance structure. The coastal zone ecological protection and governance structure comprises at least one coastal zone ecological protection wall 100, a storage reservoir 200, and a drainage channel 300. The coastal zone ecological protection wall 100, the storage reservoir 200, and the drainage channel 300 are arranged around the coastline, The coastal zone ecological protection and governance structure has ecological protection and governance functions of orderly drainage, clarification and storage of rainwater.

As shown in FIG. 1, the coastal zone ecological protection wall 100 comprises a bottom plate 1, a triangular reinforcing supporting plate 2, and a side plate 3. Installing holes are defined on the bottom plate 1, the triangular reinforcing supporting plate 2, and the side plate 3. The installing holes are configured for anchor rods 10 to pass through.

The bottom plate 1 is configured to fix on a foundation through the anchor rods 5. The triangular reinforcing supporting plate 2 is fixedly arranged on a corresponding bottom plate 1 through bolts. The side plate 3 is arranged on the bottom plate 1 and is connected with the triangular reinforcing supporting plate 2. The side plate forms a certain angle with the bottom plate 1. The bottom plate 1, the triangular reinforcing supporting plate 2, and the side plate 3 are formed by a plurality of prefabricated plates. Vegetation 6 is provided on one side of the coastal zone ecological protection wall away from the coastline.

In the embodiment, a first side of the bottom plate 1 and a first side of the side plate 3 are flat. A plurality of reinforcing plates are arranged on a second side of the bottom plate 1 and the second side of the side plate 3.

The reinforcing plates are staggeredly arranged horizontally and vertically to form several cavities, and connecting holes are on the reinforcing plates arranged on an edge of the bottom plate and are on the reinforcing plates arranged on an edge of the side plate. The connecting holes are configured to connect the bottom plate 1 with the adjacent side plates 3.

In the embodiment, a shape of the triangular reinforcing supporting plate 2 is an isosceles right-angled triangle. A hypotenuse of the triangular reinforcing supporting plate 2 is fixed to the bottom plate 1 when in use.

Figure 2:
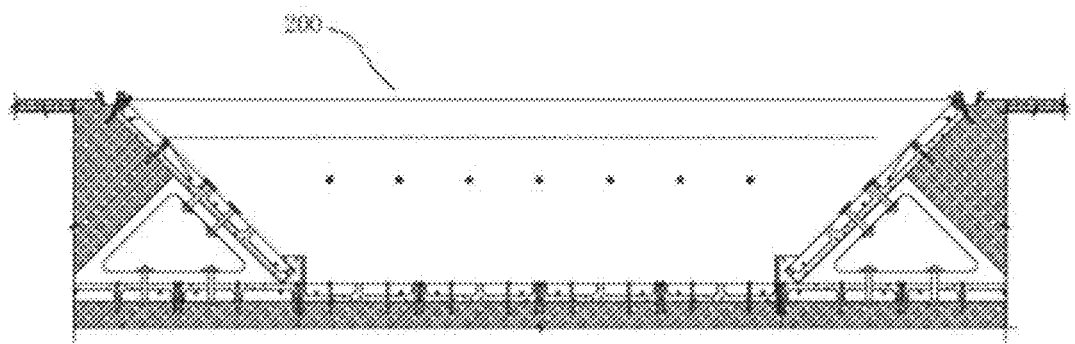
FIG. 2 is a cross-sectional schematic diagram of a storage reservoir according to one embodiment of the present disclosure.
Figure 3:
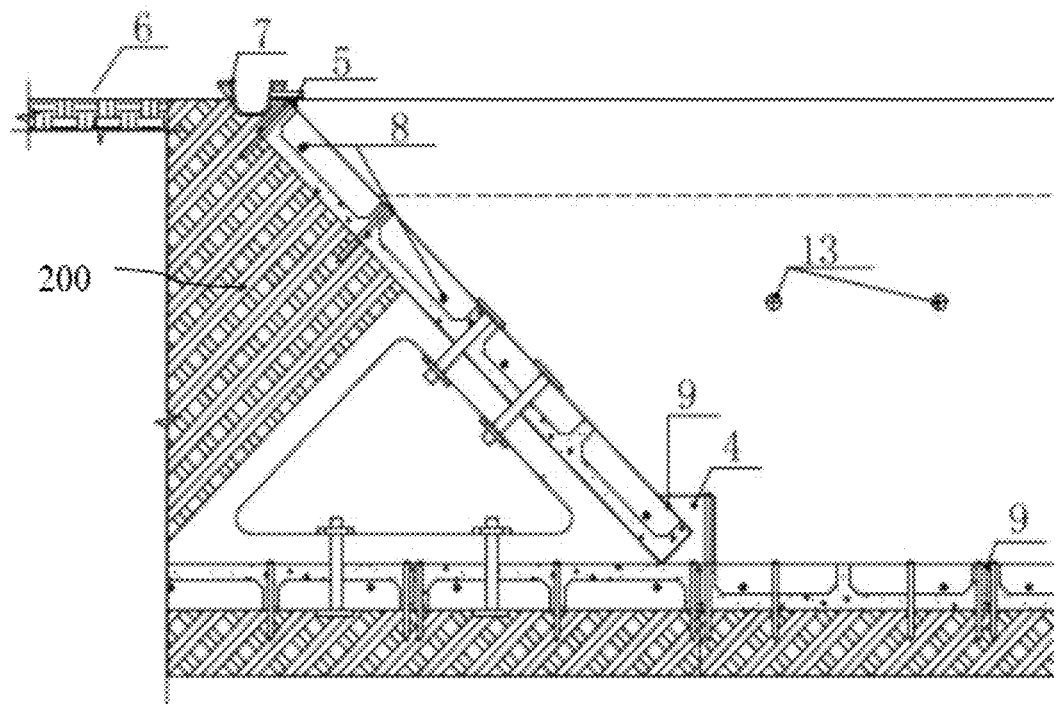
FIG. 3 is an enlarged partial view taken from FIG. 2.
Figure 5:
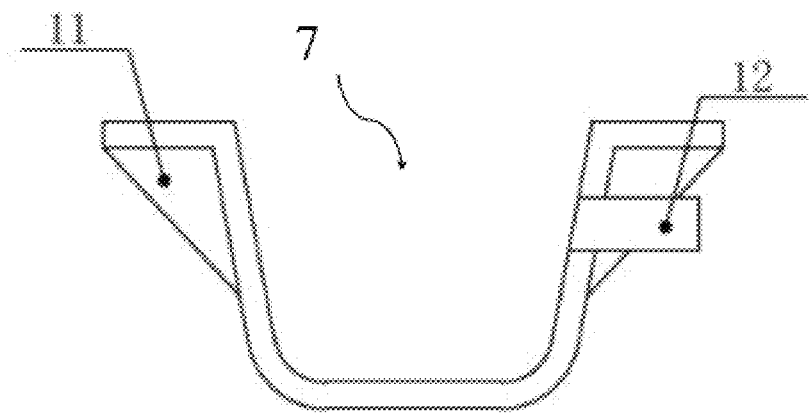
FIG. 5 is a cross-sectional schematic diagram of a clarification ditch according to one embodiment of the present disclosure.

As shown in FIG. 2-3, the storage reservoir 200 comprises side walls and a bottom portion. A structure of each side wall of the storage reservoir 200 is same as a structure of the coastal zone ecological protection wall 100. Each triangular reinforcing supporting plate 2 is connected with each side plate through side plate connecting screws 8, so as to form the side walls of the storage reservoir 200. A structure of the bottom portion of the store reservoir 200 comprise bottom plates that have a same structure of the bottom plate 1 of the coastal zone ecological protection wall 100. A difference is that one side of each bottom plate of the storage reservoir that is flat is close to the foundation, and the side with the cavities of each bottom plate of the storage reservoir 200 is far away from the foundation (that is, the side of each bottom plate with the reinforcing plates is facing upward). Adjacent bottom plates are sealed with waterproof glue 9. In addition, a drainage pipe 13 is arranged on the side wall of the storage reservoir 200. Clarification ditches 7 are arranged on a top portion of the reservoir 200. As shown in FIG. 5, each clarification ditch 7 is of a U-shaped structure. Reinforcing ribs 11 are arranged between top pieces and side walls of each clarification ditch 7. A discharging pipe 12 is arranged on one side of each clarification ditch 7 close to the storage reservoir 200. The clarification ditches 7 are communicated with the storage reservoir 200 through the discharging pipes 12.

Figure 4:
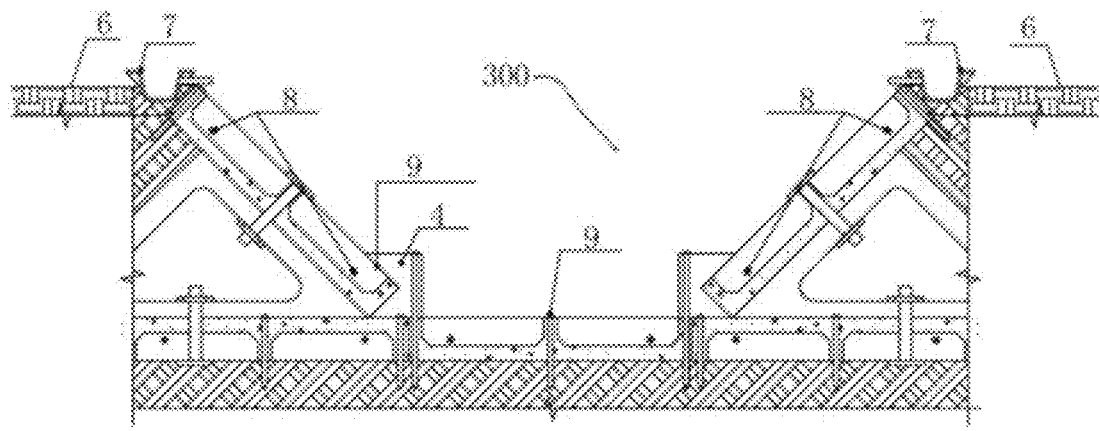
FIG. 4 is a cross-sectional schematic diagram of a drainage channel according to one embodiment of the present disclosure.

As shown in FIG. 4, a structure of the drainage channel 300 is same as the structure of the storage reservoir 200, so the illustration of the drainage channel 300 is not repeated herein. The drainage channel 300 is communicated with the storage reservoir 200. The drainage channel 300 is configured to discharge the rainwater to the storage reservoir 200 and to drain the rainwater in the storage reservoir 200 to the coastline shelterbelt or the vegetation 6.

In the coastal zone ecological protection wall 100, the storage reservoir 200, and the drainage channel 300, a wedge-shaped spacer block 4 is arranged at an oblique-angle gap between a corresponding bottom plate and a corresponding side plate.

Figure 6:
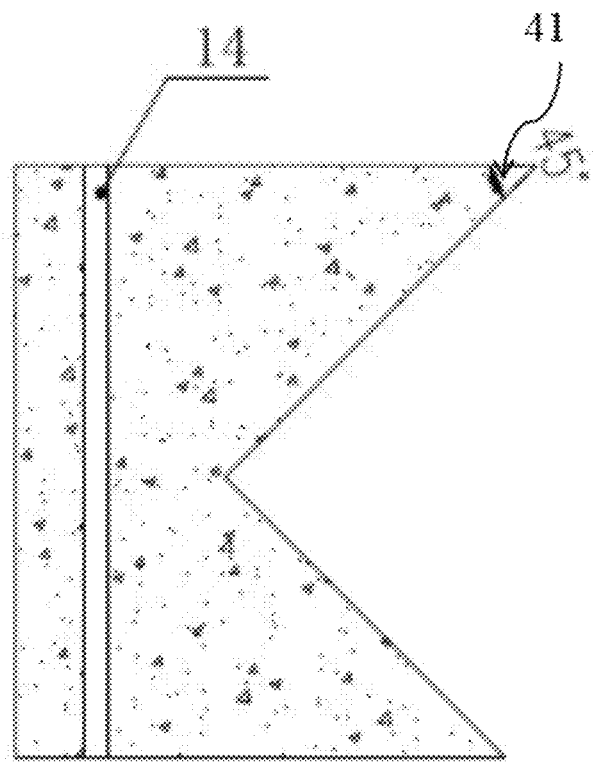
FIG. 6 is a schematic structural diagram of a wedge-shaped spacer block in an embodiment of the present invention.

Each wedge-shaped spacer block 4 is fixed with the corresponding bottom plate 1 through bolts passing through bolt holes 14. As shown in FIG. 6, a notch 41 is defined on one side of each wedge-shaped spacer block 4. The notch 41 of each wedge-shaped spacer block 4 is matched with one end of each side plate 3 close to the corresponding bottom plate 1. An angle of each notch 41 is 45°. A bevel gap between wedge-shaped spacer block 4 and the corresponding bottom plate and the corresponding side plate is sealed with waterproof glue.

An installation method of the coastal zone ecological protection and management structure is as follows:

Installation of the coastal zone ecological protection wall 100 is as follow:

Step 1: laying out lines according to a design drawing in a predetermined installing position of the coastal zone ecological protection wall 100; excavating foundation in sections; compacting and leveling the foundation until it reaches design requirements;

Step 2: putting the prefabricated plates one by one according to the structure of the bottom plate of the coastal zone ecological protection wall according to the design drawing; connecting the prefabricated plates firmly with bolts; and then driving the anchor rods into ground; if the foundation is loose, solidifying soil around the anchor rods by polymer adhesive to stably fix the bottom plate;

Step 3: installing the side plate according to the design drawing; first installing the triangular reinforcing supporting plate 2, then installing the side plate on the triangular reinforcing supporting plate through bolts; and then applying waterproof glue to the wedge-shaped spacer block; placing the wedge-shaped spacer block in the oblique-angle gap between the bottom plate and the side plate; fix the wedge-shaped spacer block with bolts; and Step 4: backfilling sand layer by layer after an installation of the side plate is completed and checking of the side plate meets the design requirements.

Installation of the storage reservoir 200 is as follow:

Step 1: laying out lines according to a design drawing of the storage reservoir; excavating foundation of the storage reservoir; compacting and leveling the foundation of the storage reservoir;

Step 2: putting the prefabricated plates one by one on the bottom portion of the storage reservoir; connecting the prefabricated plates firmly with bolts to form the bottom plates of the storage reservoir; after plane patch and connection of the bottom plates is completed, fixing all the bottom plates with the anchor rods, sealing all of joints of the bottom plate with structural glue to prevent water leakage;

Step 3: installing the side plates of the storage reservoir; first installing the triangular reinforcing supporting plates, applying the structural glue to ends of the side plates and ends of the triangular reinforcing supporting plates; then sequentially fixedly installing the side plates on the triangular reinforcing supporting plates through bolts; installing the wedge-shaped spacer blocks; fixing the wedge-shaped spacer blocks with bolts. backfilling the sand layer by layer until it meets the design requirement after an installation of the side plates is completed;

Step 4: fixing the side plates with the anchor rods, bonding and fixing the anchor rods with surrounding sand by polymer adhesive materials; and Step 5. Installing the drainage pipe; testing the drainage pipe by water for a week, checking whether there is any leaking point of the drainage pipe; if there is a leaking point, dealing with the leaking point in time.

Installation of the drainage channel 300 is as follow:

Step 1: excavating foundation of the drainage channel according to a design drawing of the drainage channel; compacting and leveling the foundation of the drainage channel;

Step 2: putting the prefabricated plates row by row on the bottom portion of the drainage channel; connecting ends of the prefabricated plates firmly with bolts to form the bottom plates of the drainage channel; then nailing the anchor rods to the ground to fix the bottom plates;

Step 3: installing the side plates, first installing the wedge-shaped spacer block and fix them with the bottom plates, and then installing the side plates. At this time, the side plates should be temporarily positioned, and the sand is backfilled layer by layer to two-thirds of the height of the drainage channel; applying the structural glue to ends of the side plates and ends of the triangular reinforcing supporting plates; then sequentially fixedly installing the side plates on the triangular reinforcing supporting plates through bolts; and Step 4: fixing the side plates with the anchor rods, bonding and fixing the anchor rods with surrounding sand by polymer adhesive materials.

Installation of the clarification ditches is as follow:

The steps of the Installation of the clarification ditches are same as the drainage channel, and the vegetation adapted to the environment is planted on the outside of the clarification ditches, and the width of the vegetation is greater than 2 meters.

The coastal zone ecological protection and governance structure is a necessary systematic project for coastline shelterbelt, and it is also an important link to realize carbon sink afforestation, which well prevents invasion of tidal winds, waves, sea fog, and tsunamis, prevents soil erosion, and enables the coastal ecology to have a strong carbon sequestration capacity.

What is claimed is:

1. A coastal zone ecological protection wall, comprising: a bottom plate, a triangular reinforcing supporting plate, and a side plate; the bottom plate is configured to fix on a foundation; the triangular reinforcing supporting plate is arranged on the bottom plate; the side plate is arranged on the bottom plate and is connected with the triangular reinforcing supporting plate; the side plate forms a certain angle with the bottom plate; all of the bottom plate, the triangular reinforcing supporting plate, and the side plate are spliced by a plurality of prefabricated plates, wherein the coastal zone ecological protection wall further comprises a wedge-shaped spacer block; the wedge-shaped spacer block is arranged at an oblique-angle gap between the bottom plate and the side plate, wherein a notch is defined on one side of each wedge-shaped spacer block, the notch of each wedge-shaped spacer block is matched with one end of each side plate close to the corresponding bottom plate.

2. The coastal zone ecological protection wall according to claim 1, wherein installing holes are defined on the bottom plate, the triangular reinforcing supporting plate, and the side plate; the installing holes are configured for anchor rods to pass through.

3. The coastal zone ecological protection wall according to claim 1, wherein an angle of each notch is 45°.

4. A coastal zone ecological protection structure, comprising: the coastal zone ecological protection wall according to claim 1, a storage reservoir and a drainage channel; a drainage pipe is arranged on a side wall of the storage reservoir; the storage reservoir is communicated with the drainage channel; the drainage channel is configured to discharge rainwater to the storage reservoir and discharge the rainwater in the storage reservoir to a coastline shelterbelt.

5. The coastal zone ecological protection structure according to claim 4, wherein at least one coastal zone ecological protection wall is applied to the storage reservoir; the storage reservoir is configured to irrigate a coastline shelterbelt.

6. The coastal zone ecological protection structure according to claim 4, wherein at least one coastal zone ecological protection wall is applied to the drainage channel.

7. The coastal zone ecological protection structure according to claim 4, wherein clarification ditches are arranged on a top portion of the storage reservoir and a top portion of the drainage channel; the clarification channel ditches is communicated with the storage reservoir or the drainage channel through discharging pipes.

* * * * *